(12) United States Patent
Domodossola et al.

(10) Patent No.: US 7,104,780 B2
(45) Date of Patent: Sep. 12, 2006

(54) PLATEN MOUNTED POST MOLD COOLING APPARATUS AND METHOD

(75) Inventors: Robert Domodossola, Brampton (CA); Robin A. Arnott, Alliston (CA); Christopher Huntington, Alliston (CA)

(73) Assignee: Husky Injection Molding Systems Limited, (CA)

( * ) Notice: Subject to any disclaimer, the term of this patent is extended or adjusted under 35 U.S.C. 154(b) by 376 days.

(21) Appl. No.: 10/393,045

(22) Filed: Mar. 21, 2003

(65) Prior Publication Data

US 2004/0185136 A1    Sep. 23, 2004

(51) Int. Cl.
*B29C 45/42* (2006.01)
*B29C 45/78* (2006.01)

(52) U.S. Cl. .................. 425/534; 425/444; 425/547

(58) Field of Classification Search ............... 425/444, 425/534, 547, 556, 436 RM
See application file for complete search history.

(56) References Cited

U.S. PATENT DOCUMENTS

| | | | |
|---|---|---|---|
| 3,804,568 A | 4/1974 | Rees | 42/139 |
| 4,124,352 A * | 11/1978 | Pasch | 425/556 |
| 4,140,464 A * | 2/1979 | Spurr et al. | 425/533 |
| 4,205,950 A | 6/1980 | Keil et al. | 425/126.1 |
| 4,449,913 A * | 5/1984 | Krishnakumar et al. | 425/548 |
| 4,721,452 A * | 1/1988 | Delfer, III | 425/547 |
| 4,729,732 A | 3/1988 | Schad et al. | 425/526 |
| 4,836,767 A | 6/1989 | Schad et al. | 425/552 |
| RE33,237 E | 6/1990 | Delfer, III | 425/547 |
| 5,338,172 A * | 8/1994 | Williamson et al. | 425/143 |
| 5,354,194 A | 10/1994 | Kresak | 425/436 |
| 5,447,426 A | 9/1995 | Gessner et al. | 425/436 |
| 6,171,541 B1 | 1/2001 | Neter et al. | 264/328.14 |
| 6,223,541 B1 | 5/2001 | Farrag | 62/62 |

FOREIGN PATENT DOCUMENTS

| | | |
|---|---|---|
| EP | 0 947 304 A | 10/1999 |
| WO | WO 02/20241 A | 3/2002 |

OTHER PUBLICATIONS

Patent Abstracts of Japan, vol. 0130, No. 28 (M-788), Jan. 23, 1989; JP 63 239023 A (Suiriyou Plast KK), Oct. 5, 1988.
"Pet Preform Molding Machines", Injection Molding, XX, JP, Dec. 1998, p. 86, XP 002950054.

* cited by examiner

*Primary Examiner*—Joseph S. Del Sole
*Assistant Examiner*—Emmanuel S. Luk
(74) *Attorney, Agent, or Firm*—Katten Muchin Rosenman LLP

(57) ABSTRACT

Platen-mounted, post-mold cooling apparatus and method includes structure and/or steps for handling molded parts in an injection molding machine having a fixed platen, a moving platen, a core half, and a cavity half. A take off device coupled to the fixed platen is configured to remove molded parts from either the core half or the cavity half. A cooling device coupled to the moving platen is configured to cool the molded parts carried by the take off device. Preferably, the take off device extracts the just molded parts from the mold's core half and then moves linearly outboard of the mold halves. The subsequent movement of the moving platen to close the mold in the next molding cycle causes the cooling device's pins to engage the molded parts in the take off device part carriers. When the moving platen opens again, the molded parts are extracted from the part carriers by the cooling device pins. When the moving platen is fully open, the cooling device is rotated to eject the cooled parts from the machine.

24 Claims, 17 Drawing Sheets

PLATEN MOUNTED POST MOLD COOLING APPARATUS AND METHOD

BACKGROUND OF THE INVENTION

1. Field of the Invention

The present invention relates to a method and apparatus for cooling molded plastic articles after the molding operation is finished. In particular, the present invention relates to method and apparatus for an injection molding machine equipped with a post mold cooling ("PMC") device mounted on a moving platen that cooperates with a multi-position robot take out plate to both cool the interior of the parts and to (preferably) selectively unload some of the molded part carriers on the multi-position take out plate. The method and apparatus are particularly well suited for cooling injection molded thermoplastic polyester polymer materials, such as polyethylene terephthalate ("PET") preforms.

2. Related Art

A variety of post mold cooling methods are currently employed on injection molding machines to optimize the cooling of freshly molded plastic parts. Such methods include conductively cooling the parts while they are still inside the mold cavities, blowing air on the exteriors of the molded parts after they are extracted from the mold, and blowing air into the interiors of the molded parts. Some parts (for example plastic preforms) are typically injection-molded using PET resin, and can have wall thicknesses varying from about 2.00 mm to greater than 4.00 mm, and require extended cooling periods to solidify into substantially defect-free parts. Heavy walled parts (such as those made from a material that has a high resistance to thermal heat transfer, like plastic resin) can exhibit "reheating" phenomena that can produce defective parts after they have been ejected from the mold.

In the case of PET preforms, some manufacturing defects are:

Crystallinity: The resin recrystallizes due to the elevated temperature of the core resin not cooling quickly enough. The white appearance of the crystals impairs the clarity of the final product and provides an area of potential weakness in a resultant blown product.

Surface blemishes: The ejected performs, initially having solidified surfaces are reheated by the core material which causes the surface to soften and be easily marred. Sometimes this surface reheating can be severe enough to cause touching parts to weld together.

Geometric inaccuracies: Handling partly-cooled performs or attempting to further cool them in devices that do not maintain their geometric shape while their surfaces are reheated can cause the preform's round diameter to become oval shaped or the smooth surface to become wrinkled or non-linear.

The above-noted problems could be alleviated somewhat by extending the cooling time of the injection molded performs in their mold. However, this will cause the injection molding cycle to be lengthened, typically 25 seconds or longer, wherein the majority of this time would be used solely for cooling purposes. In an effort to improve the production efficiency of this process, several techniques are employed to perform a post mold cooling function, wherein partially cooled preforms are ejected from the injection mold after an initially cooled surface skin has formed to allow the part to be ejected without deformation. The partially cooled preforms are then handed off to a downstream device that continues to hold the preform while removing the remaining heat so that the preform can subsequently be handled without damage. Typically, the preform surface temperature needs to be lowered to about 70° C. to ensure safe handling.

The early ejection of partially cooled preforms releases the injection molding equipment earlier in the molding cycle, thereby significantly improving the production efficiency of the equipment. Injection molding cycle times typically were halved from 25 seconds to about 12 seconds or less (in some instances) depending on the preform design being molded.

Some examples of post mold cooling technology are shown in U.S. Pat. Nos.: 3,804,568; 4,729,732; 4,836,767; Re. 33,237; 5,447,426; and 6,171,541.

U.S. Pat. No. Re. 33,237 discloses a robotically-controlled multi-position take out plate for removing partially cooled injection molded parts from the core side of an injection mold. The parts are ejected from the mold directly into cooled carriers, as disclosed in U.S. Pat. No. 4,729,732, and transported by the robot to an outboard position where some of the parts are ejected onto a conveyor. The plate has multiple sets of carriers, each set being sufficient in number to hold one part from each of the cores of the multi-cavity mold. There are multiple sets of carriers on the plate so that multiple sets of molded parts can be held and cooled, the set that is ejected being the set that has been cooling the longest in the tubes of the plate. However, these patent documents do not disclose cooling the interior of the parts. Moreover, the disclosed method of ejecting the parts relies on the termination of a vacuum that is holding the parts in the carriers, thereby allowing gravity to cause the parts to fall out when the take out plate has been rotated 90 degrees to a discharge position.

U.S. Pat. No. 6,171,541 discloses inserting a cooling pin (CoolJet™) into the interior of partially cooled part to discharge a cooling fluid therein to assist cooling. Also disclosed therein is a procedure to apply a vacuum through the same cooling pin to cause the part to remain attached to the pin when it is moved away from the carrier holding the part, thereby removing the part from the carrier. The pins, mounted to a frame, are then rotated 90 degrees to a discharge position and the vacuum terminated to allow the parts to fall off the pins. However, there is no disclosure of mounting the frame and pins onto a moving platen to utilize the motion of the moving platen to insert and retract the pins with respect to the parts.

U.S. Pat. No. 4,836,767 discloses a rotatable table mounted on the moving platen on which are mounted two core sets for the mold. While one core set is in the closed mold position for injection molding parts, the other is positioned outboard for ejecting the parts into cooled carriers that are mounted on an indexable, four-sided carousel that is mounted to the stationary platen of the machine. Four sets of molded parts can be carried on the carousel allowing an extended cooling time to be performed. The parts remain on the cores for one additional cycle time sequence that provides a small extension of cooling time of the interior of the parts before they are transferred to the carousel. However, there is no disclosure of repeated or multiple cooling of the parts' interiors.

U.S. Pat. No. 3,804,568 discloses a robot mounted to the moving platen of an injection molding machine, wherein the robot drives a take out plate into and out of the open mold area to remove ejected parts. A second transfer plate then unloads the take out plate while it is in the outboard position. The motion of the moving platen is used, via cams and linkages, to actuate the take out plate vertical motion and to synchronize it mechanically so that there is no risk of collision with the mold during its operation. However, there is no disclosure of part cooling, either exterior or interior, while the parts are being transported by either plate.

U.S. Pat. No. 5,354,194 discloses a molded part removal unit mounted to the side of the fixed platen. However, there is no disclosure of any cooling treatment.

An earlier Husky preform molding system used a robot with a single position take out plate with carriers to unload PET preforms. The robot was mounted on the stationary platen and moved the take out plate vertically. In the outboard position, above the mold, a vacuum tube carrier of a transfer plate was aligned with the carriers and removed the molded parts therefrom by application of vacuum to their interiors. The transfer plate moved to a second outboard position at the non-operator side of the machine and rotated to allow the parts to drop from the tubes when the vacuum was terminated. However, there was no blowing or cooling of the interior of the parts during their handling.

With reference to FIGS. 1–4, top plan views of an injection molding machine 10 are shown comprising, an injection unit 11, a clamp unit 12, a robot unit 13, and a CoolJet™ unit 14. Also included is an injection mold comprising two halves: (i) the cavity half 15, containing mold cavities 19, attached to the stationary platen 16 of the machine 10; and (ii) the core half 17 which is attached to the moving platen 18 of the machine 10.

The robot unit 13 is mounted atop the stationary platen 16 and includes a horizontal "Z" beam 20 that projects to the non-operator side of the machine and upon which rides a carriage 21, moved along the beam by (typically) a servo-electric driven belt drive (not shown). Vertical "Y" beam 22 is attached to the carriage 21 and this supports the multi-position take out plate 23 upon which are mounted multiple sets of carriers 24 that may be cooled for transporting multiple molded shots of parts ejected from the mold from an inboard (loading) position, as shown in FIG. 1, to an outboard position as shown in FIGS. 2–4 inclusive.

The transfer device 14 includes a plate 25 upon which are mounted multiple transfer pins 26, one for each carrier 24 on the multi-position take out plate 23. The plate 25 is supported on slides 27 and can be moved toward and away from the carriers 24, when in their outboard position, by cylinder 28.

In operation, one shot of molded parts is transferred into the carriers 24 when the mold is open and the multi-position take off plate 23 is positioned such that empty carriers are aligned with parts on the mold cores 29. In the example shown in FIG. 1, a 48-cavity mold is transferring 48 parts into 48 carriers on a 3 position take off plate 23. The multi-position take off plate 23 is then moved to its outboard position by the robot 13, as shown in FIG. 2. The mold is then closed and clamped for the next molding cycle. Meanwhile, the transfer device 14 activates a cylinder 28 to move the plate 25 and its transfer pins 26 so as to enter the parts held in the carriers 24. This engaged position is shown in FIG. 3.

Just before the molding cycle ends, the transfer pins 26 are extracted from the parts, and the robot 13 causes the multi-position take off plate 23 to rotate 90 degrees (as shown in FIG. 4) by means of a servo motor on the end of an arm 22, or alternatively a crank and cylinder arrangement (not shown). The respective vacuums holding the parts in the carriers 24 are selectively shut off in the order of the parts that have been held in the carriers the longest, in this example for three molding cycles. These parts fall out of the carriers onto a conveyor beneath (not shown). The remaining parts continue to be held in their carriers by vacuum. The multi-position take off plate 23 is then returned to the vertical orientation ready for entry into the open mold area to pick up the next shot of molded parts in the recently vacated carriers 24.

The injection molding machine described above therefore unloads the molded parts into the multi-position take off plate 23 by positioning the plate at various inboard locations to fill the most recently vacated carriers, and then moves them to one outboard position aligned with the transfer device. This outboard position is the same in all cases, where all the parts are dealt with by the transfer device. Thus, each part receives the same treatment the same number of times as there are sets of carriers 24 on the multi-position take off plate 23, in this example three times.

A number of disadvantages are present in the injection molding machine configuration described with respect to FIGS. 1–4. First, the multi-position take off plate 23 is heavy. In larger systems such as those with 432 carriers (to operate with a mold having 144 cavities), the plate can weigh in excess of several hundred kilograms (Kg), as the weight includes not only the structure of the plate and carriers themselves but also the weight of multiple shots of parts plus the weight of any cooling fluid in the plates and carriers, typically water. The effect of this heavy weight when mounted on the end of a cantilevered Y beam 22 (which itself is movably mounted on a cantilevered Z beam 20) is to cause difficulty in maintaining alignment of the carriers 24 with the mold cores and the carriers 26 after the take of plate 23 has moved quickly from the inboard position to the outboard position, and vise versa. The inertia of the plate can cause it to vibrate when quickly being brought to rest in one of its stationary positions, and cycle time can be lost in waiting for motion oscillations to damp out sufficiently before attempting a part transfer or cooling tube insertion.

A second disadvantage in the injection molding machine configuration described above is that when unloading the carriers 24, the entire multi-position take off plate 23 must be rotated 90 degrees and back again quickly. Again, because of the weight and inertia involved, a high-performance, high-cost actuation device must be used if the rotation is not to take too long, since the time taken for this motion is time unavailable for CoolJet™ treatment.

Furthermore, since the transfer device 14 engages each part in each carrier on every cycle, all the parts receive multiple applications of the same treatment. The ability to provide different treatments to the parts in these multiple events is not possible.

A third disadvantage is that the time available for treatment to be applied by the CoolJet™ device is reduced by the time it takes for the multi-position take off plate 23 to rotate to the horizontal position, eject selected parts and rotate back to the vertical position.

SUMMARY OF THE INVENTION

According to a first aspect of the present invention, structure and/or steps are provided for a molded part handling apparatus for an injection molding machine having a fixed platen, a moving platen, a core half, and a cavity half. A take off device is coupled to the fixed platen and is configured to remove molded parts from one of the core half and the cavity half. A cooling device is coupled to the moving platen and is configured to cool the molded parts carried by the take off device.

According to a second aspect of the present invention, structure and/or steps are provided for an injection molding machine including a core half, a cavity half, and a fixed platen coupled to one of the core half and the cavity half. A moving platen is coupled to the other one of the core half and the cavity half. A take off device is coupled to the fixed platen and is configured to extract freshly molded parts from the core half. A take off device actuator is configured to linearly move the take off device to a position outboard of the fixed platen after the take off device has extracted the freshly molded parts from the core half. A cooling device is coupled to the movable platen and is configured to extract the molded parts carried by the take off device, and to eject the molded parts from the cooling device at an ejection station. A cooling device actuator is configured to rotate the cooling device about a horizontal axis to eject the molded parts at the ejection station.

According to a third aspect of the present invention, structure and/or steps are provided for a molded part transfer apparatus for an injection molding machine having a core half and a cavity half. A take off device is configured to remove molded parts from one of the core half and the cavity half. A cooling device is configured to cool the molded parts carried by the take off device. Movement control structure is configured to cause: (i) simultaneous relative movement of the core half toward the cavity half, and the cooling device toward the take off device; and (ii) simultaneous relative movement of the core half away from the cavity half, and the cooling device away from the take off device.

According to a fourth aspect of the present invention, a method of handling just molded parts in an injection molding machine having a fixed platen, a movable platen, a core half, a cavity half, a take off device, and a cooling device, includes the steps of: (1) simultaneously causing relative movement between (i) the movable platen and the fixed platen, and (ii) between the take off device and the cooling device; (2) simultaneously causing (i) the core half to engage the cavity half, and (ii) the cooling device to engage the take off device; (3) simultaneously causing (i) the core half to extract molded parts from the cavity half, and (ii) the cooling device to extract molded parts from the take off device; (4) causing the cooling device to rotate to an ejection station; and (5) causing the cooling device to eject the molded parts extracted from the take off device.

According to a fifth aspect of the present invention, the treatment time window is extended to cover substantially all the time the take off plate is in the outboard position.

Thus, the present invention advantageously provides post-mold cooling method and apparatus for efficiently cooling molded plastic pieces.

BRIEF DESCRIPTION OF THE DRAWINGS

Exemplary embodiments of the present invention will now be described with reference to the accompanying drawings in which.

DETAILED DESCRIPTION OF THE PRESENTLY PREFERRED EXEMPLARY EMBODIMENTS

1. Introduction

Figure 1:
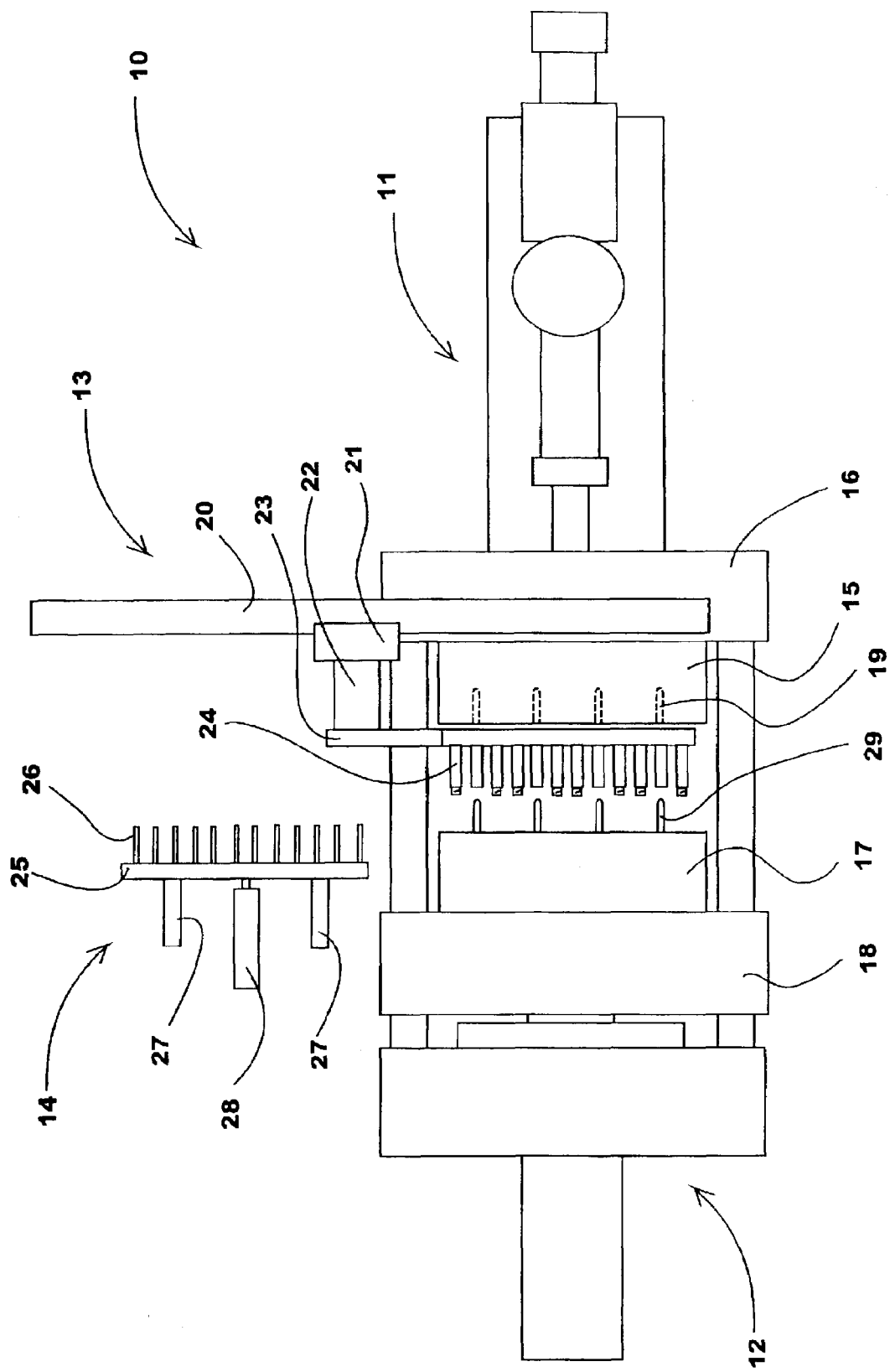
FIG. 1 is a top plan view of a molding system showing the multi-position take out plate at the inboard (loading) position.
Figure 2:
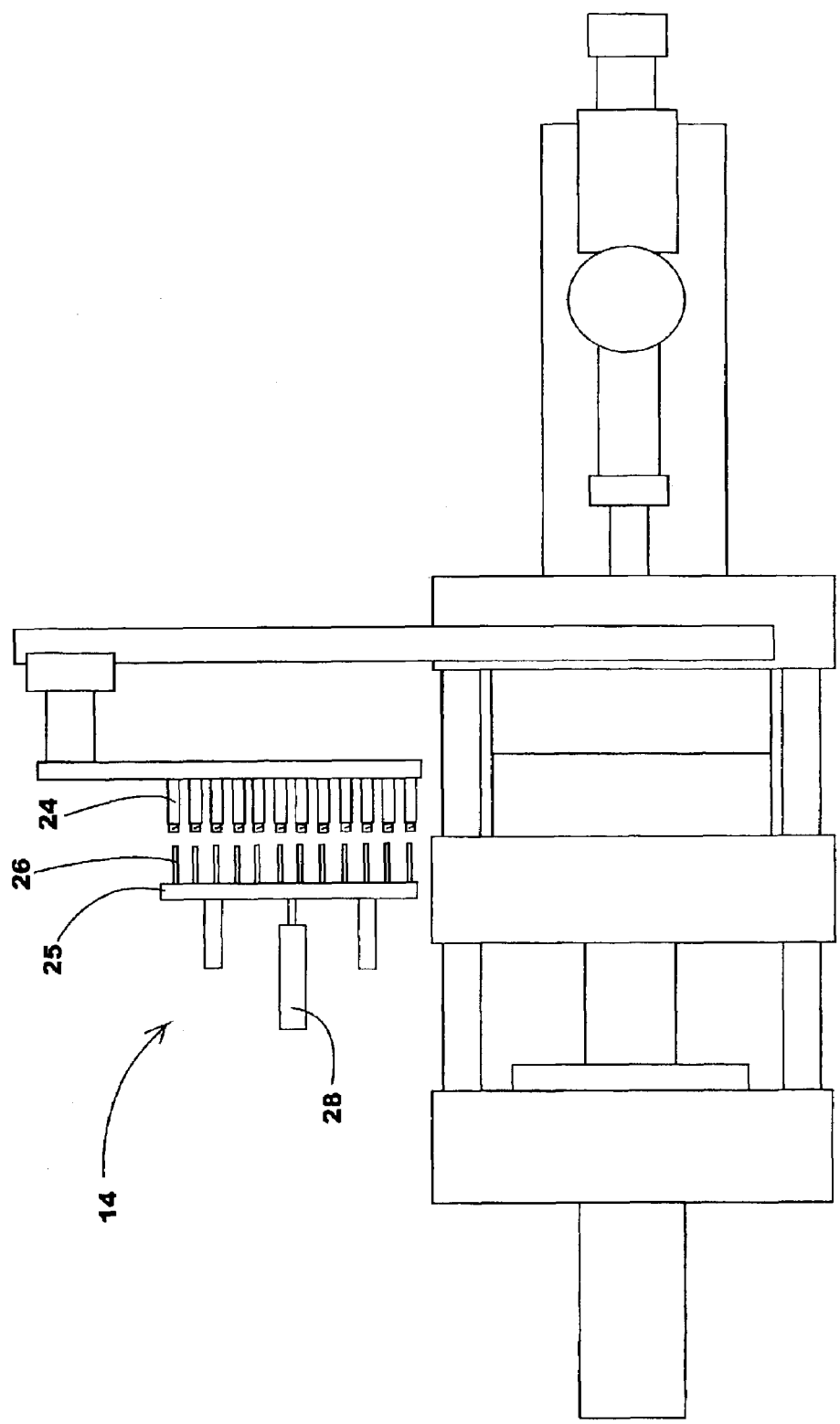
FIG. 2 is a top plan view of the FIG. 1 system showing the multi-position take out plate at the outboard position and the mold closed for molding the next shot.
Figure 3:
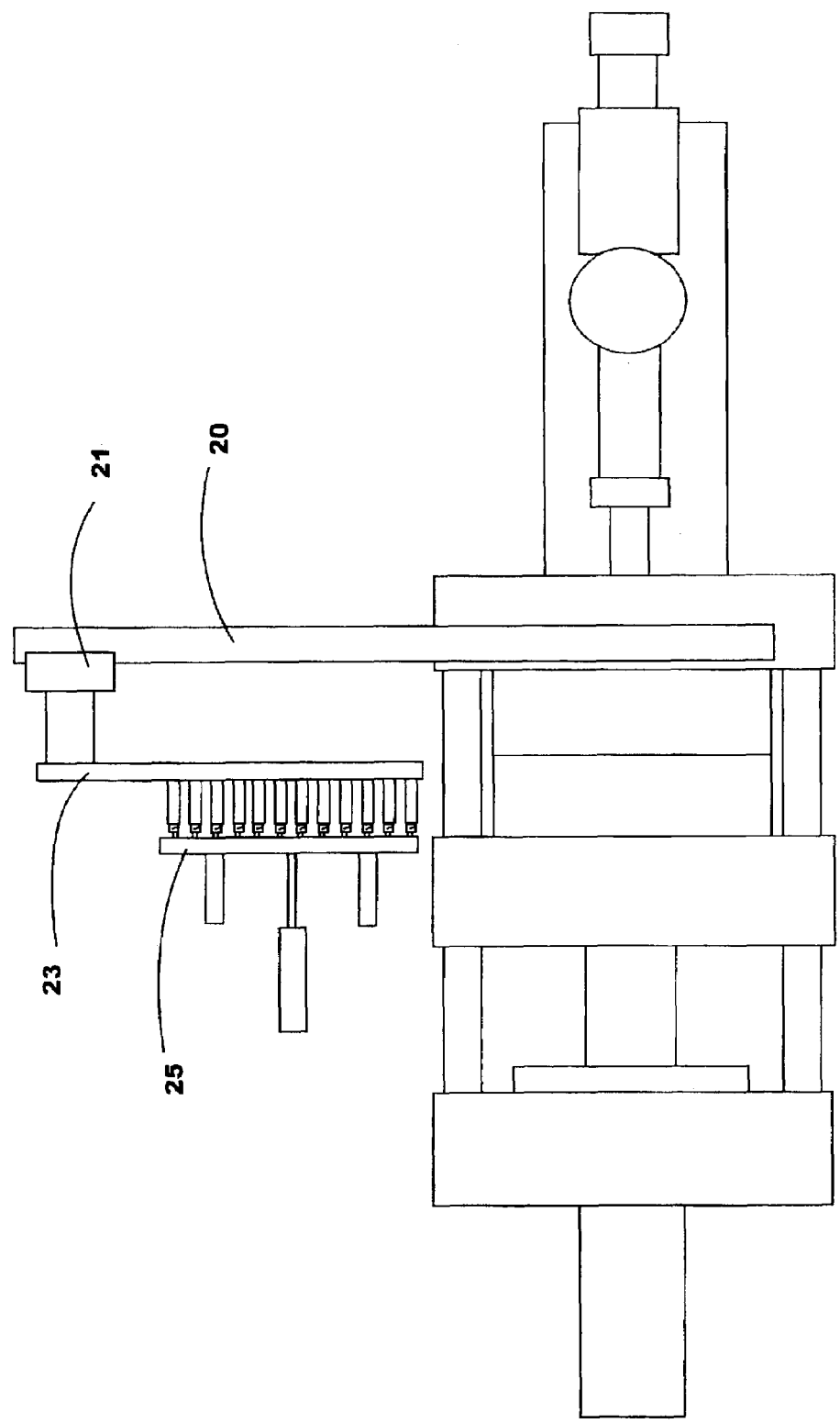
FIG. 3 is a top plan view of the FIG. 1 system showing the multi-position take out plate at the outboard position and the CoolJet™ device engaged for cooling all the parts in all the carriers.
Figure 4:
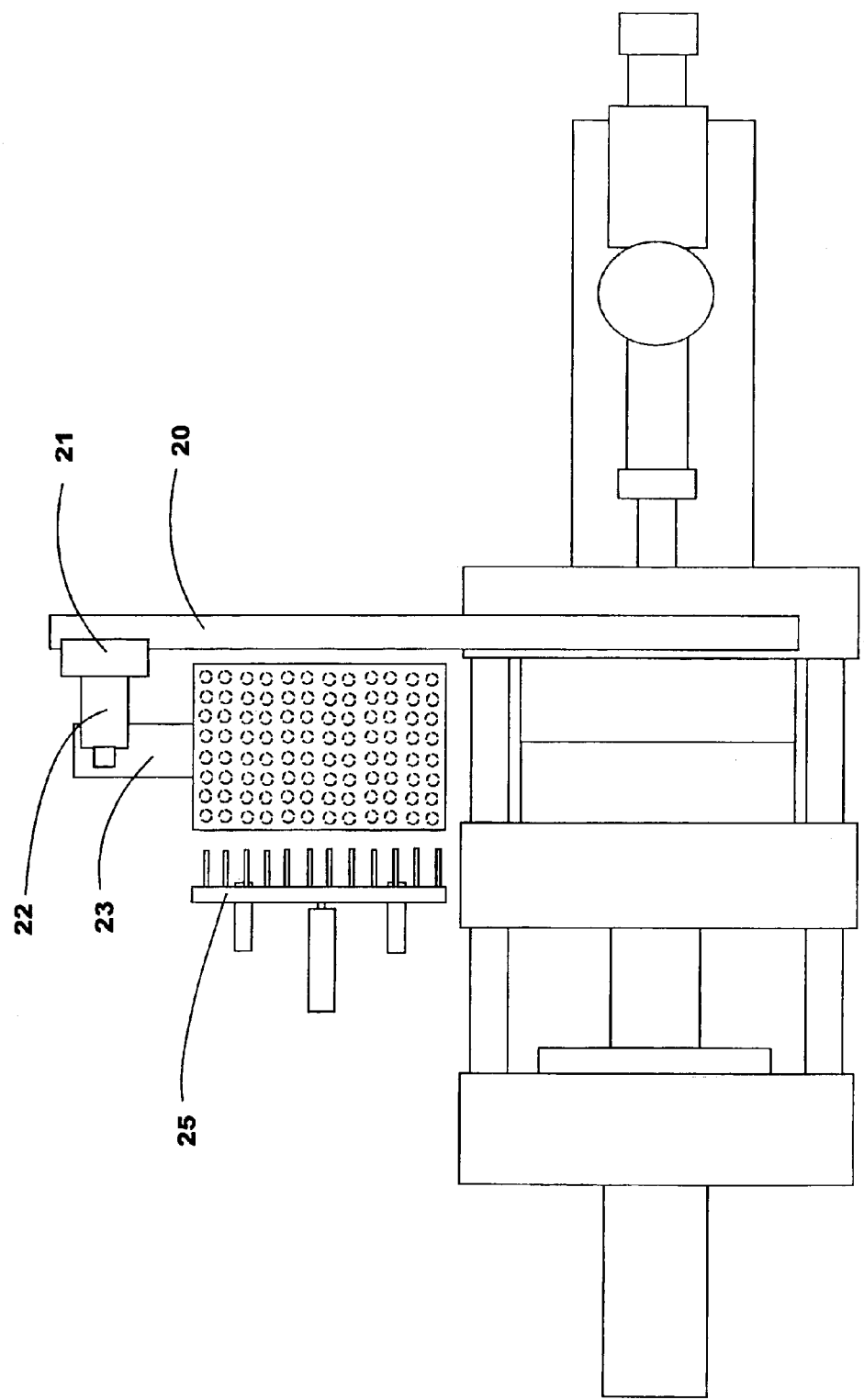
FIG. 4 is a top plan view of the FIG. 1 system showing the multi-position take out plate at the outboard position and rotated 90 degrees for selective ejection of parts.

The present invention will now be described with respect to several embodiments in which a plastic injection molding machine has a cooling device fixed to the movable platen, and a take off device fixed to the fixed platen. The cooling device has a plurality of cooling/transfer pins, and the take off device has a plurality of preform carriers. After the movable platen is moved to open the mold, the take off device moves linearly in between the mold halves to extract the freshly molded preforms from the mold cores onto the preform carriers. The take off device is then moved linearly to a position outboard of the mold halves. Then, when the movable platen moves toward the fixed platen to close the mold and mold a new set of preforms, the cooling device moves simultaneously to engage the take off device carriers with the cooling/transfer pins. When the moving platen again moves to open the mold, the preforms from the carriers are extracted by a vacuum means onto the cooling/transfer pins. By the time the moving platen has reached its fully open position, the cooling device has rotated about a horizontal axis to drop the molded and cooled parts onto a conveyor.

Preferably, the cooling device comprises a so-called treatment A device in which a cooling pin is inserted into each preform, cooling air is injected to the interior tip of the preform, and the cooling air flows down the inside surface of the preform to the outside. The cooling device may also comprise a so-called treatment B device in which a cooling pin is inserted into each preform, each preform is pressure-sealed, and cooling air is injected into the interior of the preform. The pressure causes the outside walls of the preform to contact the inside walls of the take out cavity, thus effecting cooling on both the inside and outside surfaces of the preform. The cooling device may also comprise a combination of treatment A and treatment B devices and/or equivalent structures so that each preform may be subjected to each treatment type and to more than one cooling treatment. Nevertheless, it should be understood that the teachings and claims of the subject invention are equally applicable to other molding processes used for producing other relatively thick-walled hollow articles. For example, the present invention will find applicability in many molding technologies beyond injected-molded plastic preforms, such as the molding of containers, pails, trays, paint cans, tote boxes, and similar products, or other molded products possibly with non-circular cross-sectional shapes, etc.

2. The Structure of the First Embodiment

The first preferred embodiment of the present invention is shown in FIGS. 5–11. In those Figures, a robot Z beam 30 is attached to a preferably rigid mounting plate 31 that is preferably fastened to the top of a stationary platen 32. By mounting the Z beam 30 this way, a more rigid and less bendable structure is provided. The mounting plate 31 is contoured at 33, in the area immediately above the cavity half 35 to allow easy access into the machine for slings and handling devices to load and unload parts to/from the mold.

A robot carriage 34 is movably mounted on the Z beam 30 and is moved along the beam by a servo electric belt drive (actuator) system or functional equivalent (not shown). A Y beam 36 (see FIG. 8) is attached beneath the carriage 34 and contains service channels to supply a multi-position take off plate 37. Services such as cooling fluid, vacuum lines, and electric sensor or control circuits are routed directly through the channels within the Y beam, thereby avoiding the complication of service harness loops. The multi-position take off plate 37 is mounted directly to the Y beam 36 using screws and dowels, and liquid and vacuum services are transferred through face seal connections (not shown) at the interface (also not shown) to save time in tooling change-overs. The take off plate thus moves only linearly, in the direction of arrow A. Preferably, there is no rotational mounting or drive at the end of the Y beam 36, and consequently the multi-position take off plate 37 remains in a vertical orientation at all times, with no rotational movement required. This rigid mounting system significantly reduces the inertia-induced motion oscillations experienced in the above-described system, and saves the consequential lost cycle time. The reduced number of service connections, hose and wiring hookups etc., also reduces the time taken in changing the tooling.

The multi-position take off plate 37 preferably has multiple sets of carriers 38 mounted to it which hold the molded parts by vacuum. Preferably, there are 3 sets of carriers (numbering 48 in each set in this example) so that three molding shots of parts (144 in total) from the 48-cavity mold can be carried at any one time on the multi-position take off plate 37.

Figure 7:
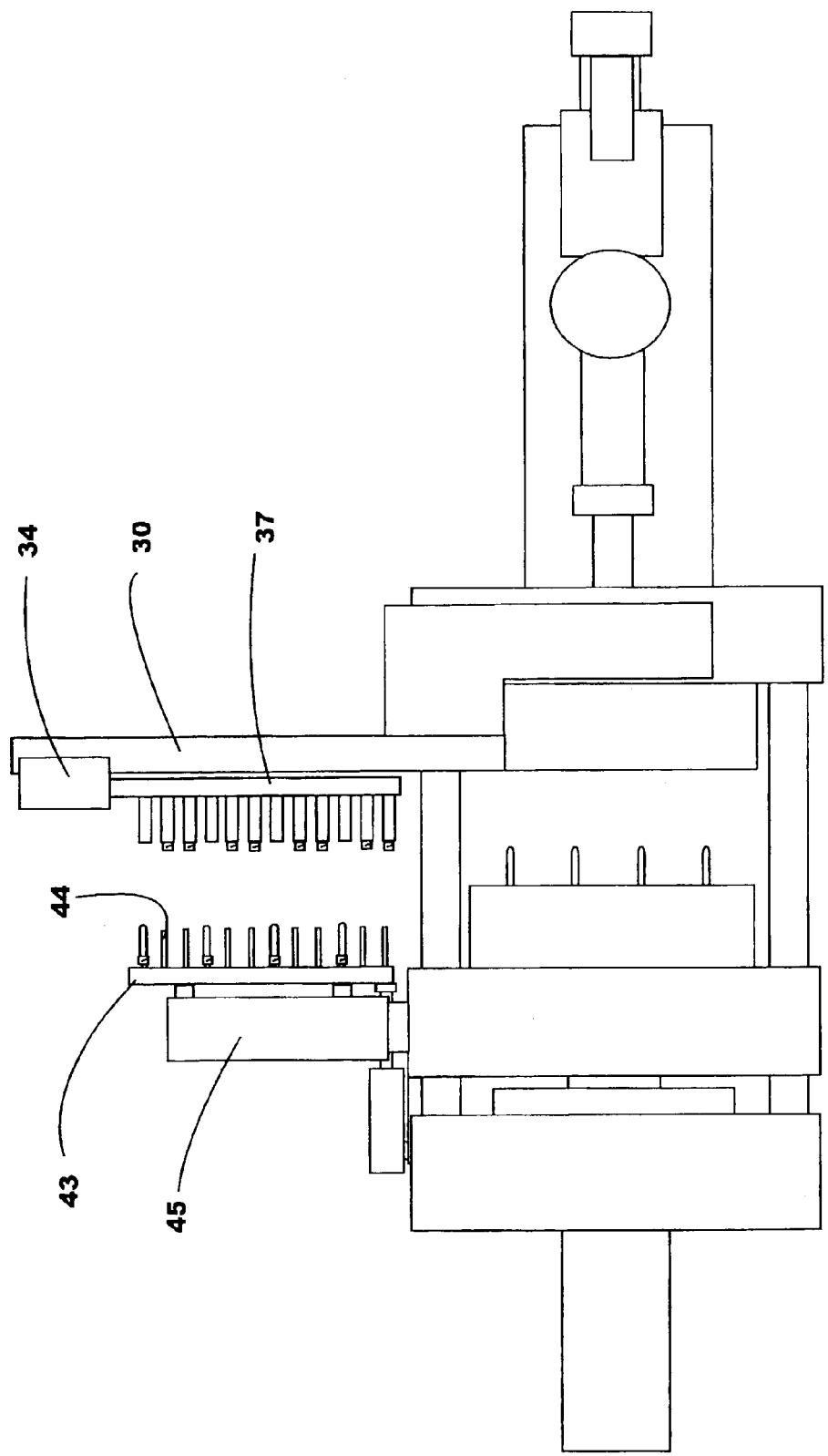
FIG. 7 is a top plan view of the FIG. 5 embodiment showing the multi-position take out plate at the outboard position with the treatment device disengaged and having retracted selected parts from the carriers.
Figure 8:
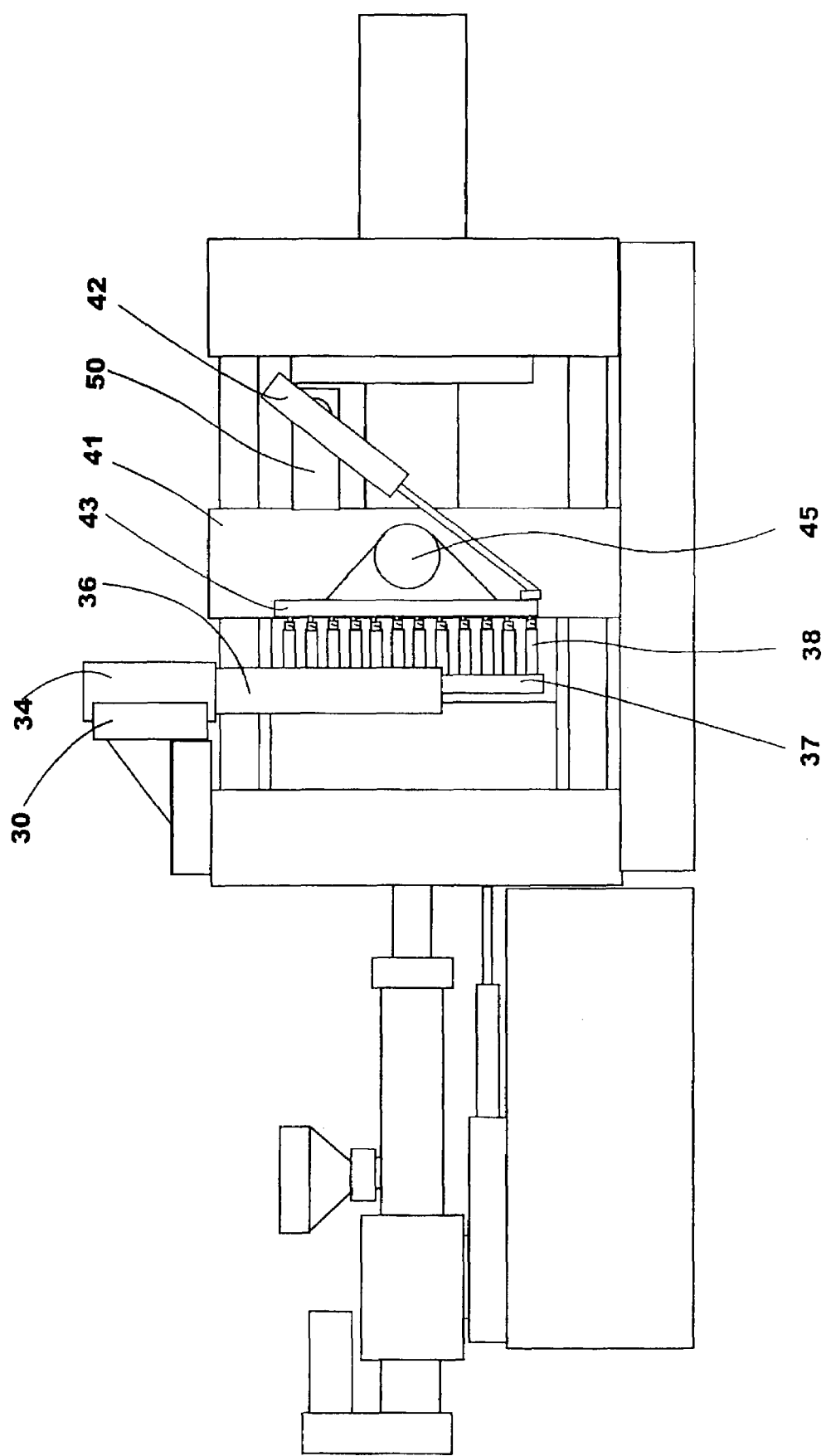
FIG. 8 is a side view of the FIG. 5 embodiment showing the multi-position take out plate at the outboard position with the treatment device engaged for cooling all of the parts in all of the carriers.
Figure 9:
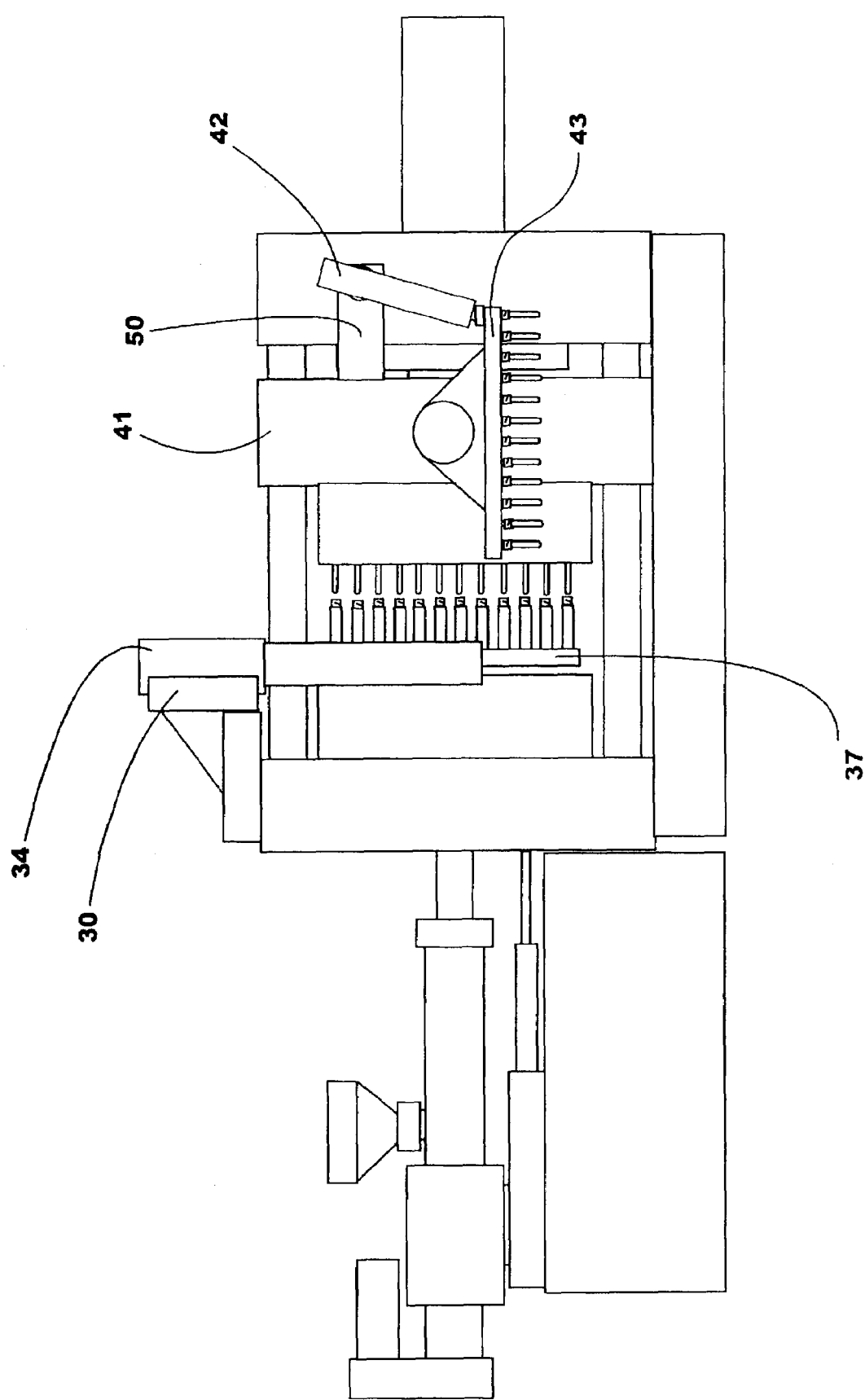
FIG. 9 is a side view of the FIG. 5 embodiment showing the multi-position take out plate at the inboard position with the treatment device rotated 90 degrees and carrying selected parts for ejection.

A treatment A device 39 is mounted on a hollow cylinder 40 on the side of the movable platen 41 such that a cylinder (actuator) 42 can cause the treatment A device 39 to rotate about (preferably only a single axis) horizontal axis through 90 degrees, as shown in FIGS. 8 and 9. The cylinder 42 is pivotably mounted on an extension arm 50 that is fastened to the movable platen 41. The plenum or plate 43 is made of lightweight aluminum, or similar material, and carries cooling pin/carriers 44 (see FIG. 7) sufficient in number to match the number of carriers 38 on the multi-position carrier plate 37.

A hollow structure 45 attaches the plenum/plate 43 to the hollow cylinder 40, and allows services to be carried from the machine through the structure 45 to the plenum/plate 43. By virtue of this lightweight construction and the fact that only one molded shot of parts are carried by the treatment device at any one time, the plenum/plate 43 can be rotated very quickly through its 90 degree arc by the cylinder 42. Alternatively, the rotation of the plenum/plate 43 can be effected by an electric drive (not shown) mounted to the hollow structure 45. Preferably, valves (not shown) control the vacuum so that it is applied to only those carriers designated to unload parts from the carriers during predetermined cycles.

The various movements of the platen, the take off plate, the treatment A device, etc, are controlled by one or more processors. For example, one or more general purpose computers, Application Specific Integrated Circuits, Digital Signal Processors, gate arrays, analog circuits, dedicated digital and/or analog processors, hard-wired circuits, etc. may control the movements of one or more components of the injection molding machine and the part handling and cooling structure described herein. Instructions for controlling the one or more processors may be stored in any convenient computer-readable medium and/or data structure, such as a floppy diskette, a hard drive, a CD-ROM, RAM, EEPROM, magnetic media, optical media, magneto-optical media, etc.

3. The Process of the First Embodiment

Figure 5:
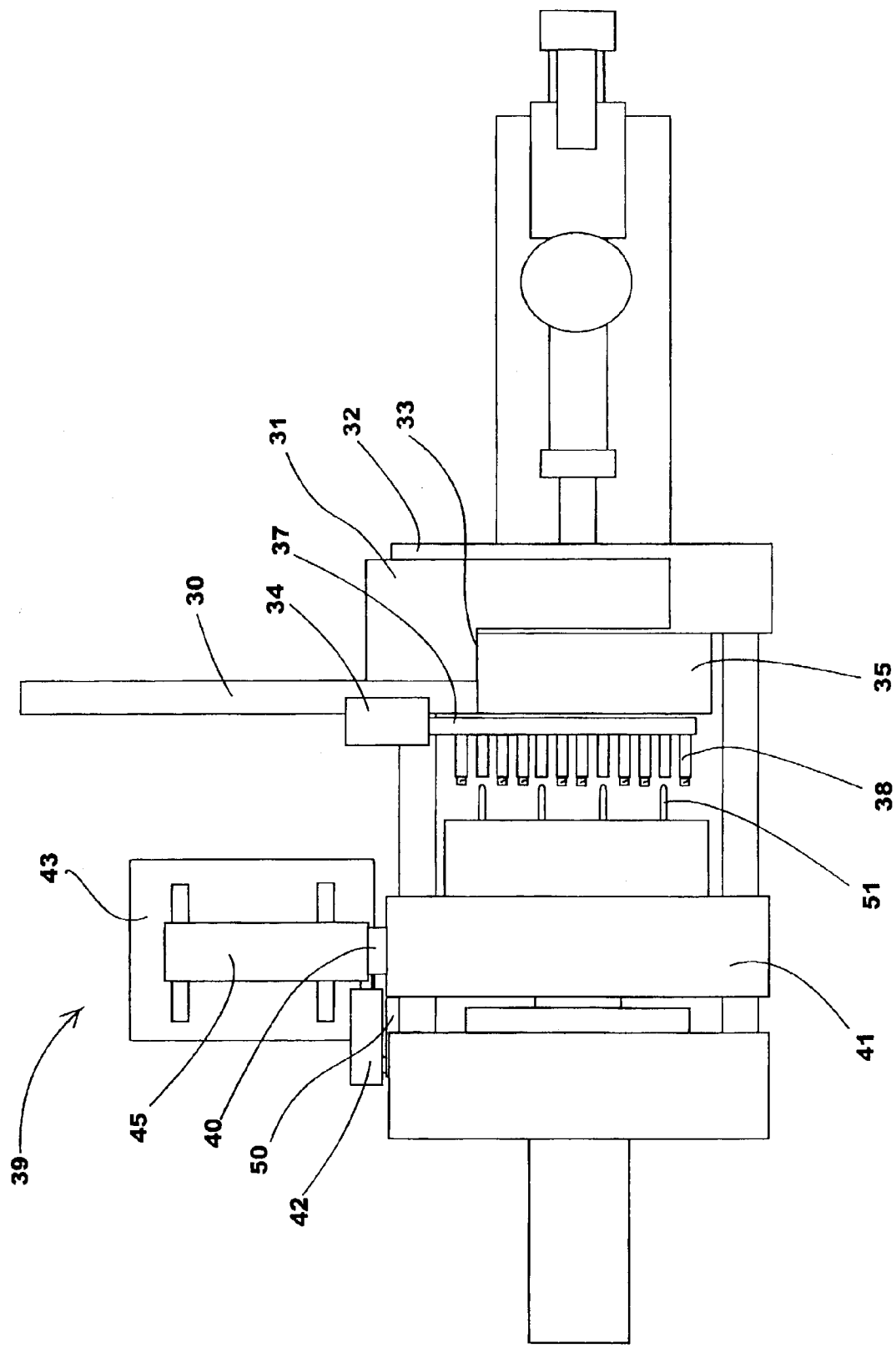
FIG. 5 is a top plan view of a first embodiment of the present invention showing a multi-position take out plate at the inboard (loading) position.
Figure 6:
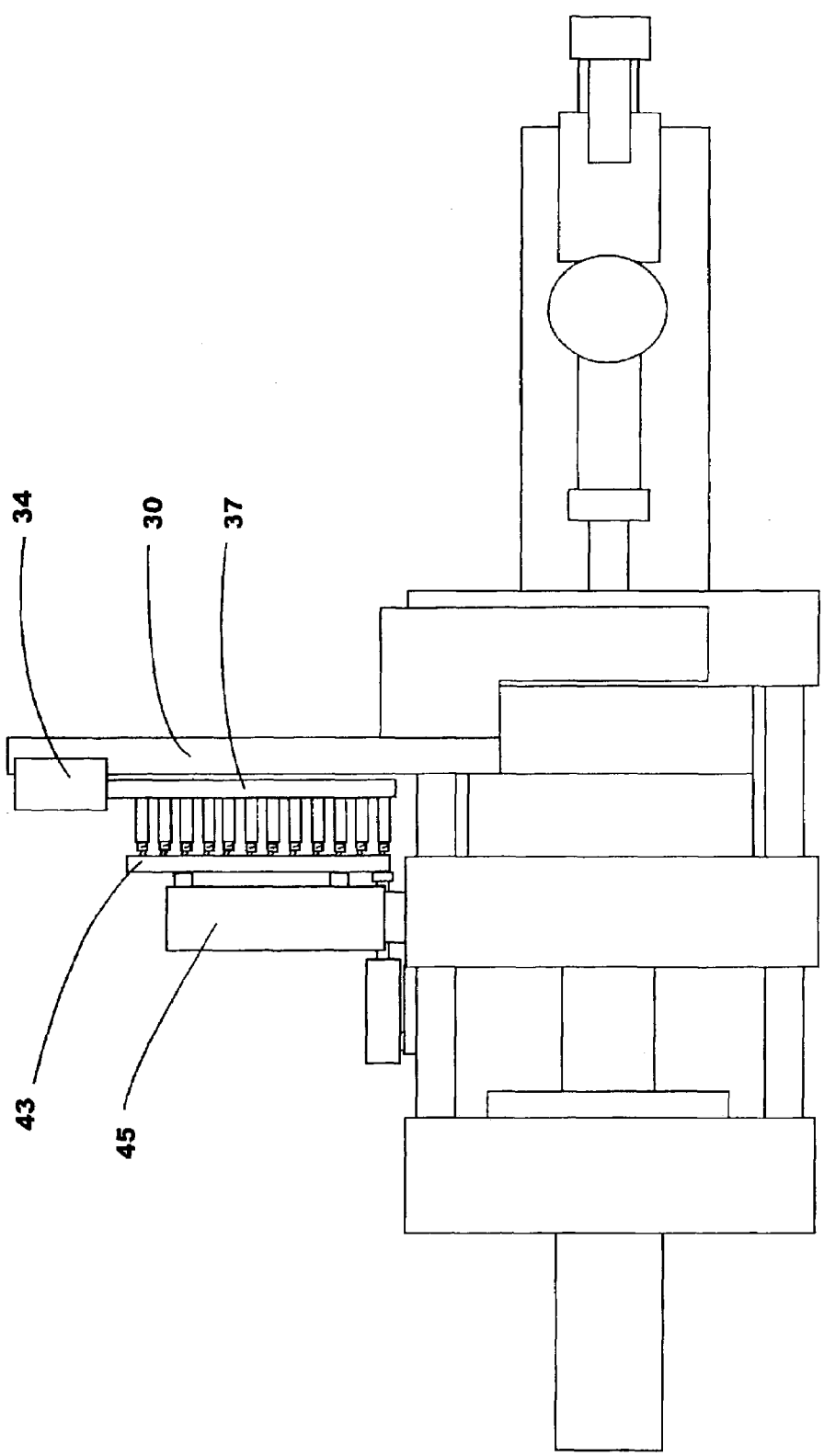
FIG. 6 is a top plan view of the FIG. 5 embodiment showing the multi-position take out plate at the outboard position with the treatment device engaged for cooling the parts in the carriers.

In operation, one shot of molded parts is transferred into the carriers 38 when the mold is open, and the multi-position take off plate is positioned such that empty carriers 38 are aligned with parts on the mold cores 51. In the example shown in FIGS. 5–11, a 48-cavity mold transfers 48 parts into 48 carriers on a three position take off plate 37 (FIG. 5). The multi-position take off plate 37 is then moved (preferably only linearly in a single direction) to its outboard position by the robot carriage 34, as shown in FIGS. 6 and 8. The mold is then closed and clamped for the next molding cycle. Meanwhile, the treatment A device 39, mounted on the movable platen 41, has been simultaneously moved forward and its cooling pin/carriers 44 have engaged the parts in the carriers 38. This engaged position is also shown in FIGS. 6 and 8 where a cooling fluid is discharged from the cooling pin/carriers 44 into the interior of the parts to assist in cooling them.

At the end of the molding cycle, the movable platen 41 opens the mold, disengaging the treatment A device 39 at the same time (FIG. 7). A vacuum force is applied to selected cooling pins/carriers 44, and the vacuum force is simultaneously released from the corresponding carriers 38 so as to cause selected parts (those parts that have been held in the carriers the longest, in this example, for three molding cycles) to transfer from the carriers 38 to the cooling pin/carriers 44 on the treatment A device 39. The remaining parts continue to be held in their carriers 38 by vacuum. The multi-position take off plate 37 then immediately reenters the open mold area to pick up the next shot of molded parts on the recently vacated carriers 38.

Figure 10:
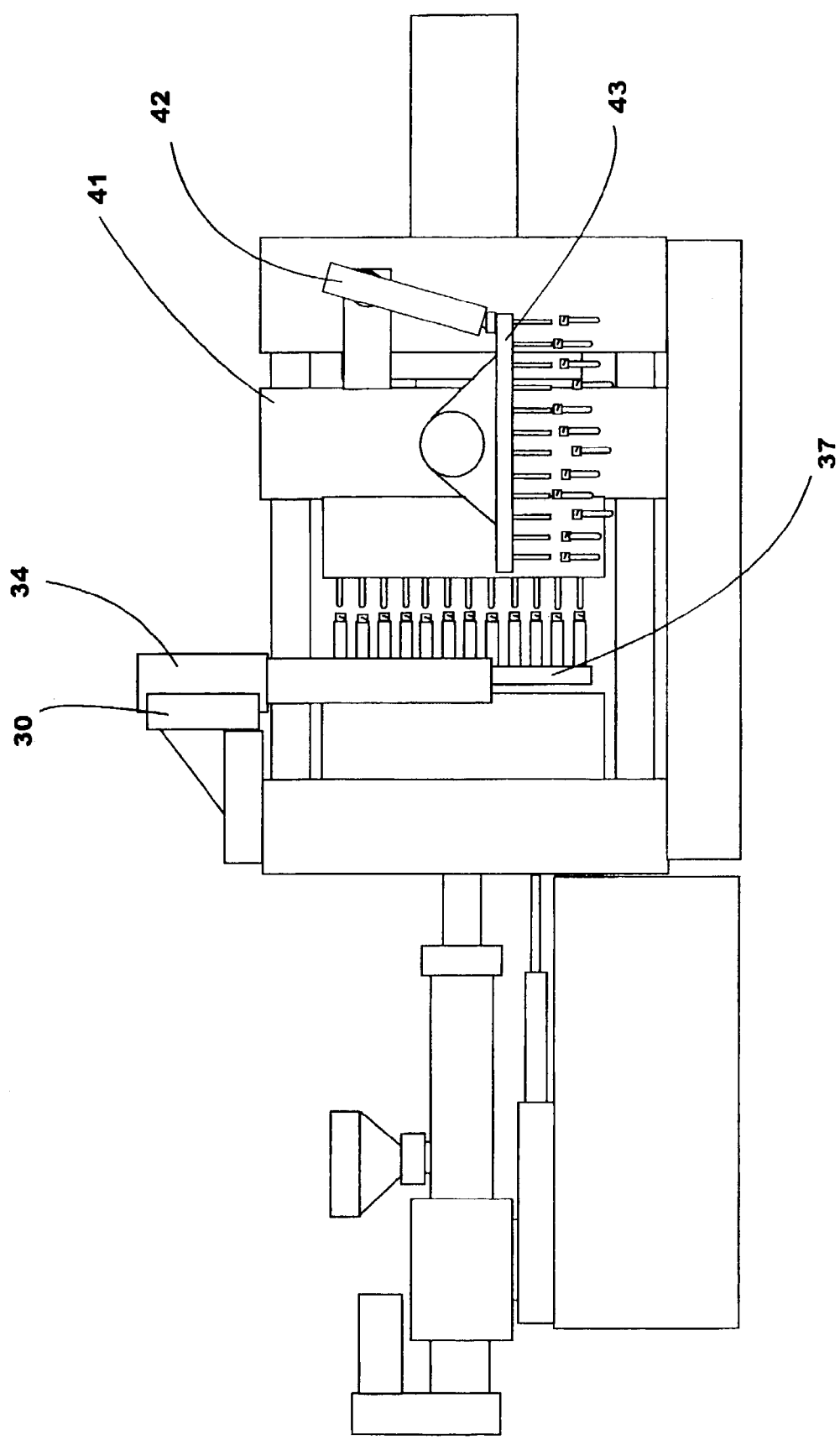
FIG. 10 is a side view of the FIG. 5 embodiment showing the multi-position take out plate at the inboard position with the treatment device rotated 90 degrees and ejecting the selected parts.
Figure 11:
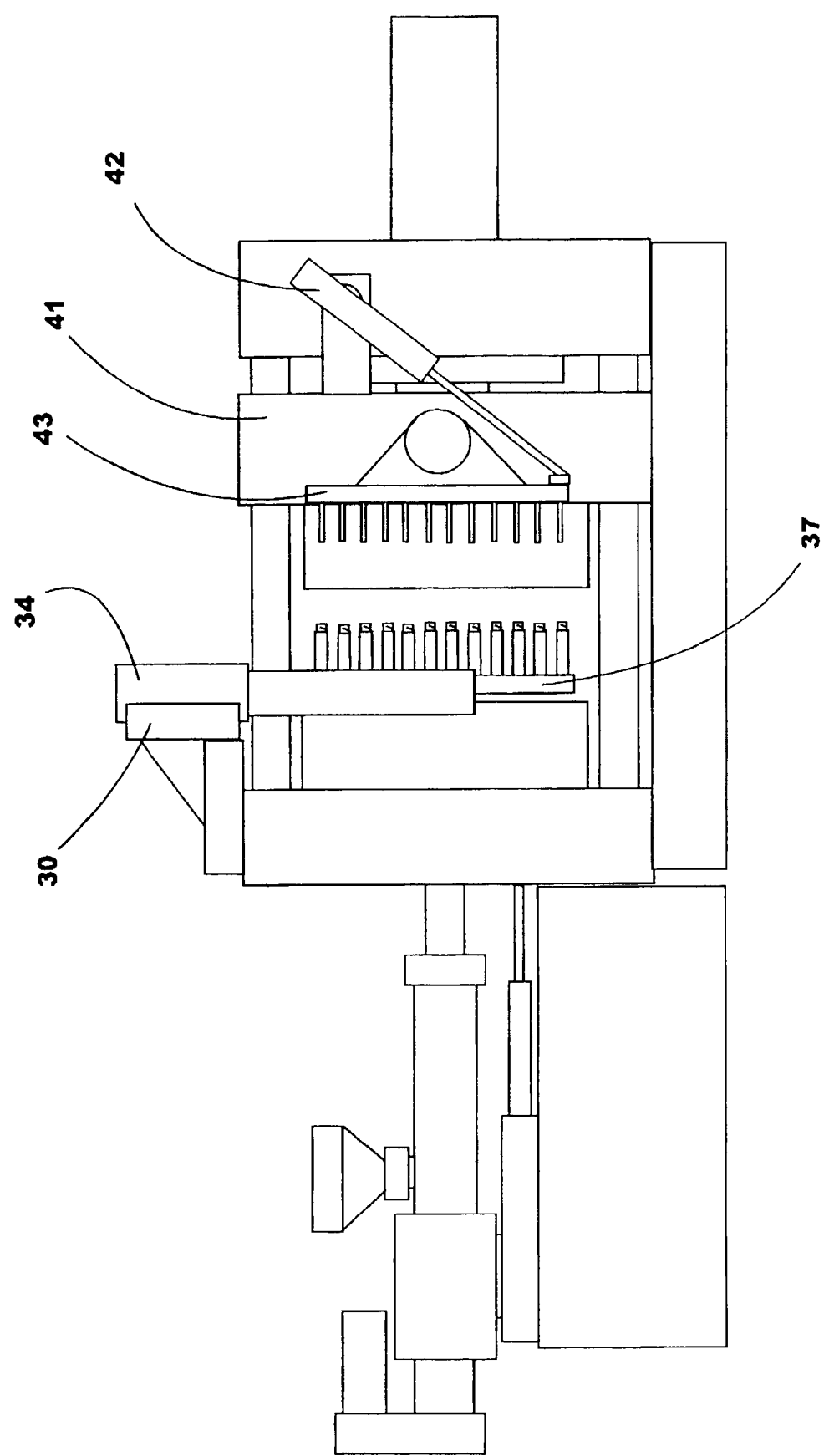
FIG. 11 is a side view of the FIG. 5 embodiment showing the multi-position take out plate at the outboard position with the treatment device realigned and ready to engage the next set of molded parts.

Meanwhile, as the movable platen 41 is opening the mold, and once the parts have cleared the carriers 38 they are vacating, the cylinder 42 is actuated to cause the plenum/plate 43 to rotate 90 degrees about a horizontal axis to face downward at an ejection station (FIG. 9), and the parts withdrawn from the carriers 38 and held on the cooling tubes 44 by vacuum force are released and allowed to fall onto a conveyor below (FIG. 10). The cylinder 42 immediately returns the plenum/plate 43 to the vertical orientation ready for entry of the cooling pin/carriers 44 into the carriers 38 as the movable platen 41 closes the mold (FIG. 6). This sequence of motions is timed so that the parts begin falling from the cooling pin/carriers 44 before the plenum/plate 43 has finished its initial 90 degree rotation and the plenum/plate 43 has minimal wait time in the horizontal position before reversing its rotation. One complete cycle, from a part being molded to the same part being ejected may take 40 seconds.

One advantage of the present invention is that the multi-position plate 37 is more accurately controlled in its motions and stopping points so that the vibration motions and consequential carrier-alignment issues are minimized. Further, by transferring the parts to the platen mounted treatment A device 39, the robot structure and function are simplified by not having a high performance drive means for the rotational axis at the end of the Y beam, thus saving weight and cost on the carriage. Additionally, by mounting the treatment A device 39 on the movable platen 41, this location moves the outboard position of the multi-position take off plate 37 closer inboard, thereby shortening the Z beam and reducing the overall width/footprint of the machine. Also, mounting the treatment A device 39 on the movable platen 41 saves the cost of providing an independent motion and guiding means for the device 39 to engage and disengage the parts in the carriers 38, these items already being providing by the movable platen itself.

4. The Structure of the Second Embodiment

Figure 12:
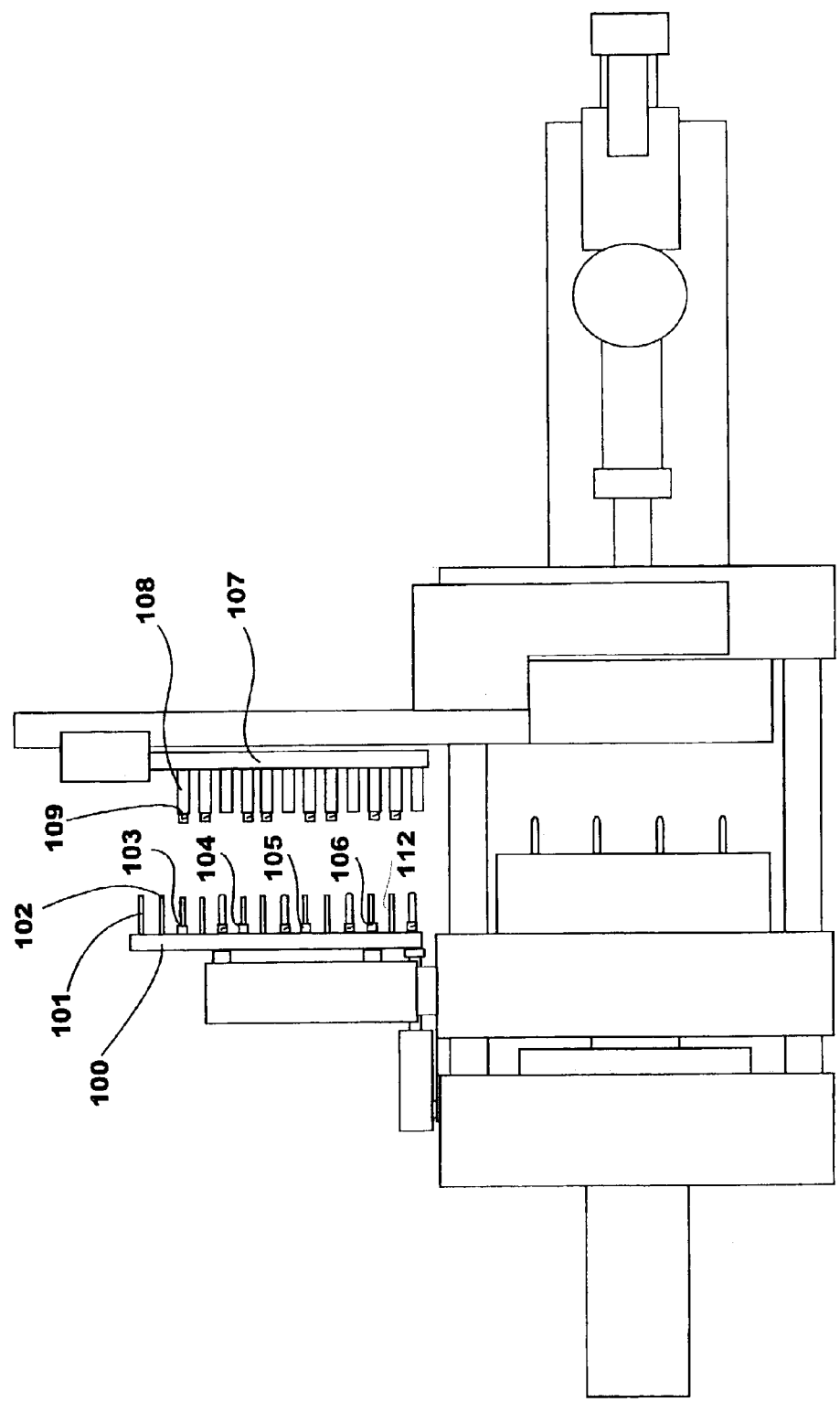
FIG. 12 is a plan view of a second embodiment of the present invention showing the multi-position take out plate at one of the three outboard positions with the, multiple treatment device carrying selected parts for ejection.

FIGS. 12 and 13 show a second embodiment of the invention in which two different treatment processes are performed on the parts while they are in their carriers. Co-pending U.S. application Ser. No. 10/147,360 filed May 17, 2002 discloses a system for temperature conditioning the interior of freshly molded parts by using a treatment A device and/or by using a treatment B device. The latter inserts a cooling tube with a sealing means so that pressurized cooling fluid introduced into the interior of the part via the tube is temporarily contained therein and pressurizes the part causing it to remain in contact with the inside surface of its carrier to maintain optimum heat transfer to the carrier by intimate contact and thereby resisting the shrinkage of the part as it cools, which, if unchecked, causes the part to lose contact with the inside surface of the carrier.

FIG. 12 shows an extended treatment A plate 100 on which an additional two rows of cooling pin/carriers 101 and 102 have been mounted. Four rows of treatment B tubes 103, 104, 105 and 106 are shown in between the rows of cooling pin/carriers 112. This example of tube layout is one so-called multiple treatment configuration suitable for operation with a three position multi-position take out plate 107; however, other combinations of treatment A tubes and treatment B tubes is possible.

5. The Process of the Second Embodiment

Figure 13A:
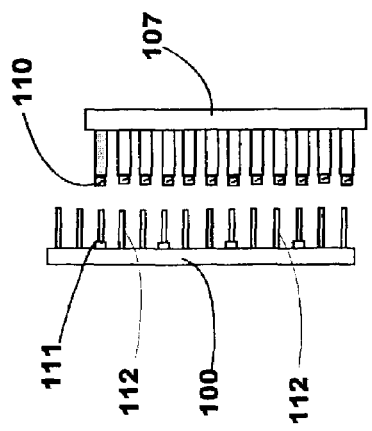
FIGS. 13a, 13b, and 13c comprise plan views of the FIG. 12 embodiment showing the multi-position take out plate at the first of the three outboard positions with the multiple treatment device shown in three positions: prior to engagement 13a; engaged 13b; disengaged with selected parts removed 13c.
Figure 13B:
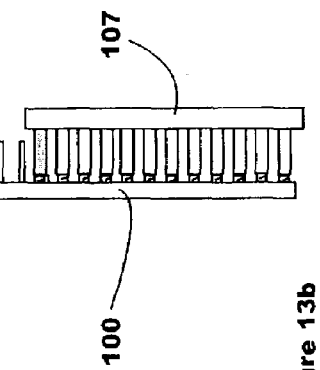
Figure 13C:
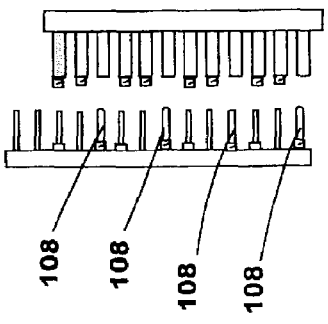

FIGS. 13a,13b,13c; 14a,14b,14c; and 15a,15b,15c, in combination, show a complete sequence of operations of the multiple treatment device and multi-position take out plate to treat the parts 109 in the carriers 108. FIG. 13a shows the multi-position take out plate 107 in the first of its three outboard positions in which freshly molded part 110 is aligned with treatment B tube 111 on the multiple treatment plate 100. All the carriers are carrying parts. Each of the freshly molded parts 110 is aligned similarly with a corresponding treatment B tube. FIG. 13b shows the multiple treatment plate 100 engaged with the parts allowing cooling treatment to take place. The treatment B tubes pressurize the interior of the parts with cooling fluid while the treatment A tubes project cooling fluid to un-pressurized parts allowing the fluid to vent out of the open end of the parts. FIG. 13c shows the multiple treatment plate 100 disengaged from the carriers and selected parts being removed by those cooling pin/carriers 112 to which a vacuum has been applied. The parts being removed comprise the molding set that has been in the carriers the longest. These parts are subsequently ejected from the tubes, as previously explained.

Figure 14A:
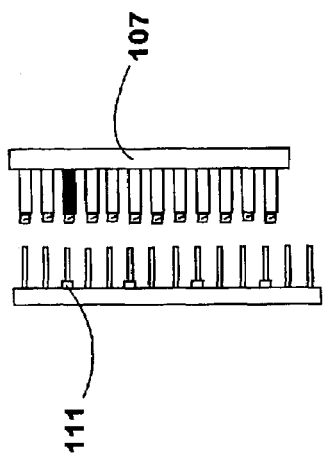
FIGS. 14a, 14b, and 14c comprise plan views of the FIG. 12 embodiment showing the multi-position take out plate at the second of the three outboard positions with the multiple treatment device shown in three positions: prior to engagement 14a; engaged 14b; disengaged with selected parts removed 14c.
Figure 14B:
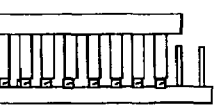
Figure 14C:
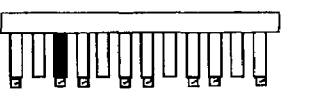

FIG. 14a shows the second outboard position of the multi-position take out plate 107 in which the next molding shot of freshly molded parts are aligned with the same treatment B tubes 111. FIGS. 14b and 14c show the remaining steps in the portion of the complete sequence in which all the parts are treated, those parts treated by the treatment B pressurizing tubes in the previous step, 14a are now treated with treatment A cooling, and the parts that have been the longest in their carriers are removed.

Figure 15A:
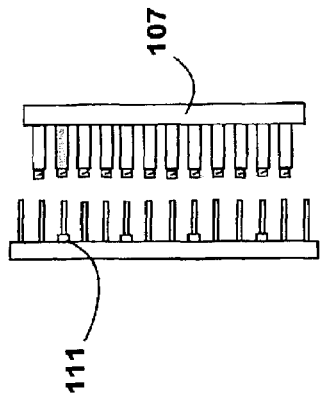
FIGS. 15a, 15b, and 15c comprise plan views of the FIG. 12 embodiment showing the multi-position take out plate at the third of the three outboard positions with the multiple treatment device shown in three positions: prior to engagement 15a; engaged 15b; disengaged with selected parts removed 15c.
Figure 15B:
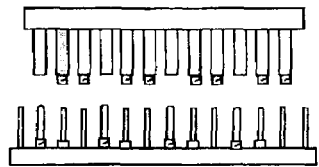
Figure 15C:
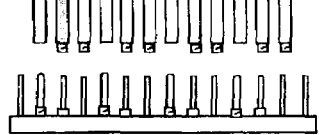

FIG. 15a shows the third outboard position of the multi-position take out plate 107 in which the next, third molding shot of freshly molded parts are again aligned with the same treatment B tubes 111. FIGS. 15b and 15c show the remaining steps in which the parts that have been in the carriers for the previous two segments of the sequence receive a second treatment A treatment prior to being removed from their tubes as shown in FIG. 15c. Thus, in the complete sequence, the parts are treated three times before being removed from their carriers.

The second embodiment also allows for a variety of combinations of either treatment A tubes or treatment B tubes mounted on the plate 100 so that parts can be treated in different sequences, including repeating, of these two processes so that an optimum post mold cooling treatment can be provided for any part configuration. Obviously, several multi-position take out plate configurations can be provided having greater or lesser numbers of carriers corresponding to the number of parts produced by a variety of multiples of molding shots, and correspondingly the multiple treatment device can be configured to match such variations so as to optimize the treatment processes provided to the parts.

Figure 16:
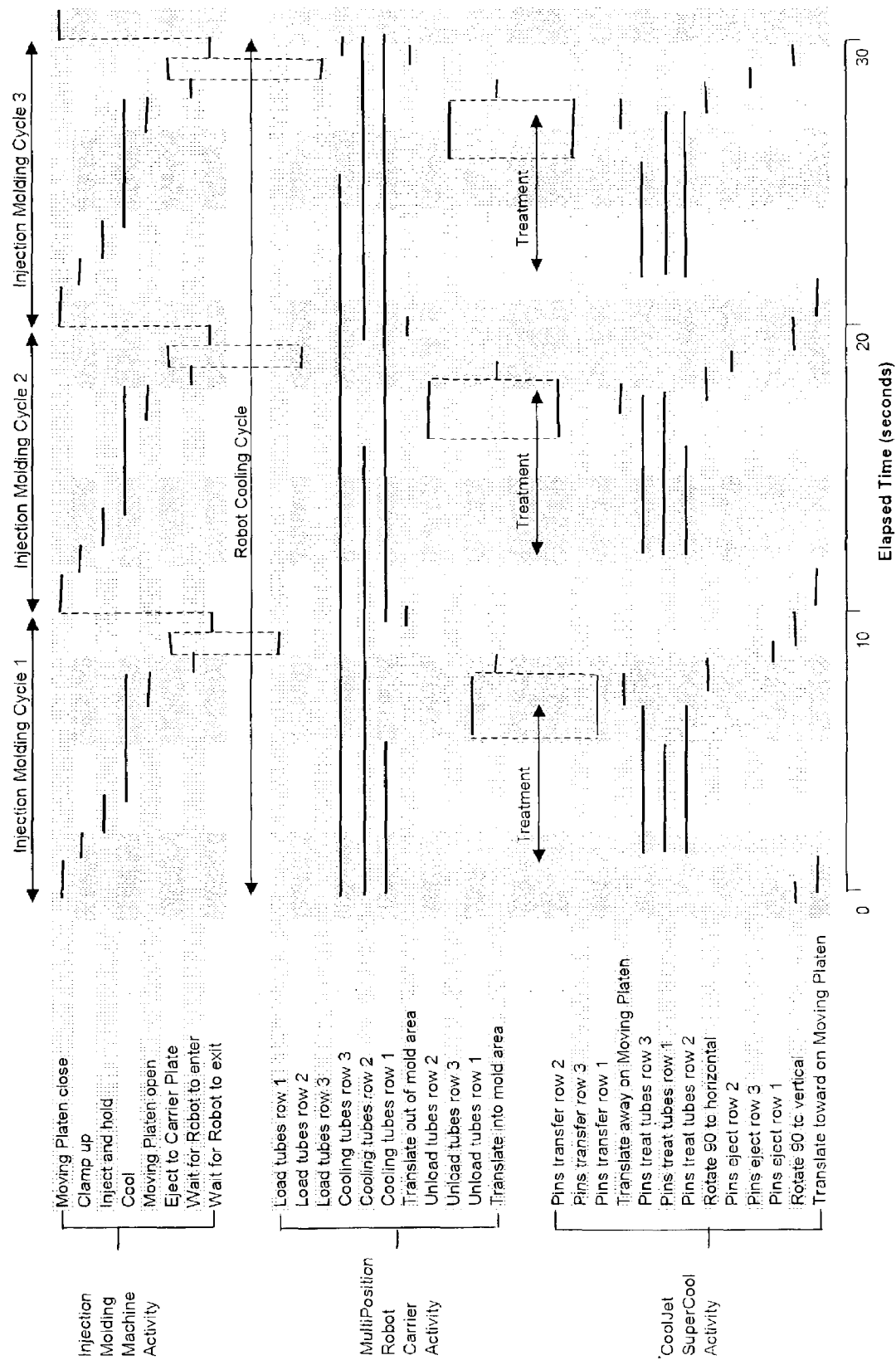
FIG. 16 is a schematic representation of three molding injection molding cycles of the preferred embodiments including the corresponding robot and treatment cycles.

FIG. 16 shows how the operations being performed by the molding machine, the robot, and the multiple treatment devices are synchronized for optimum cycle time performance. The carriers in the multi-position plate cool the parts for almost three molding cycles and there are three opportunities for the multiple treatment device to treat the parts prior to their ejection. The timing windows for parts being transferred from the molding machine to the carrier and from the carrier to the pins for ejection are shown by vertical dotted lines. An injection molding cycle time of 10 seconds is shown; however, this is exemplary and can vary depending on the specific configuration of the parts being molded. Similarly, although three sets of carriers have been shown with the corresponding numbers of multiple treatment pins, this too is exemplary and different numbers can be used depending on the number of injection mold cavities and the multiples thereof that are chosen for the specific application.

Figure 17:
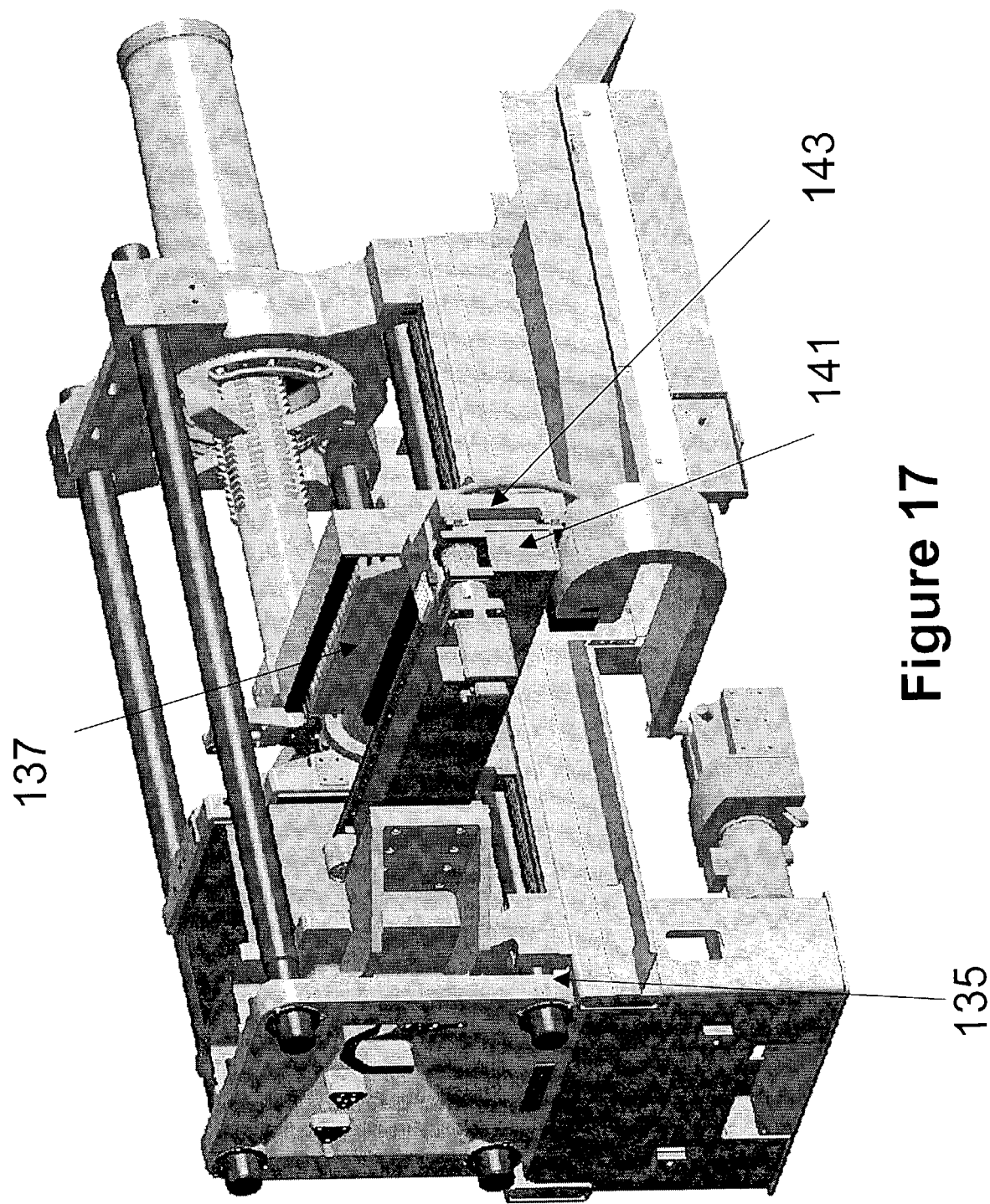
FIG. 17 is an isometric representation of the preferred embodiment of the invention showing the robot mounted to the side of the stationary platen.
Figure 18:
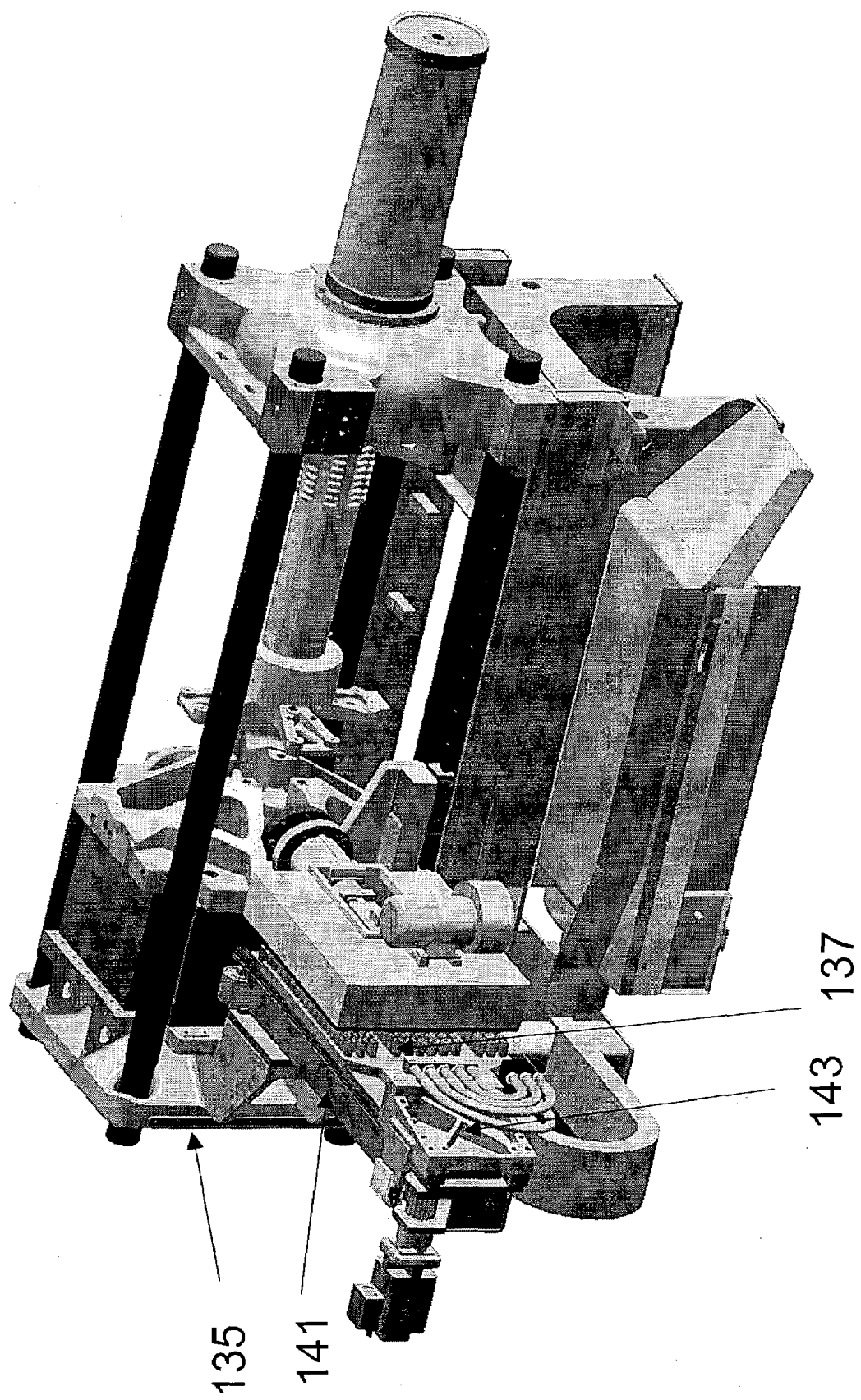
FIG. 18 is an isometric representation of the preferred embodiment of the invention shown in FIG. 17.

FIGS. 17 and 18 show a preferred embodiment of the invention in which the multi position take off device 137 is mounted to the side of the stationary platen 135 instead of to the top of the platen, as in the FIG. 5 embodiment. The same benefits are realized as the top mounted embodiment, and in addition the Y beam structure is eliminated, providing an additional saving in moving weight and cost. The Z beam 141 is mounted directly to the side of the stationary platen 135 so that the carriage 143 traveling along it and supporting the take out plate 137 is more rigidly guided. The direct mounting of the take out plate 137 to the carriage 143 and the elimination of the Y beam ensures that there is minimal deflection of the take out plate 137 during its travel, and thereby minimizes the need to wait for motion inducing oscillations to dampen before transferring parts to or from the carriers.

Figure 19:
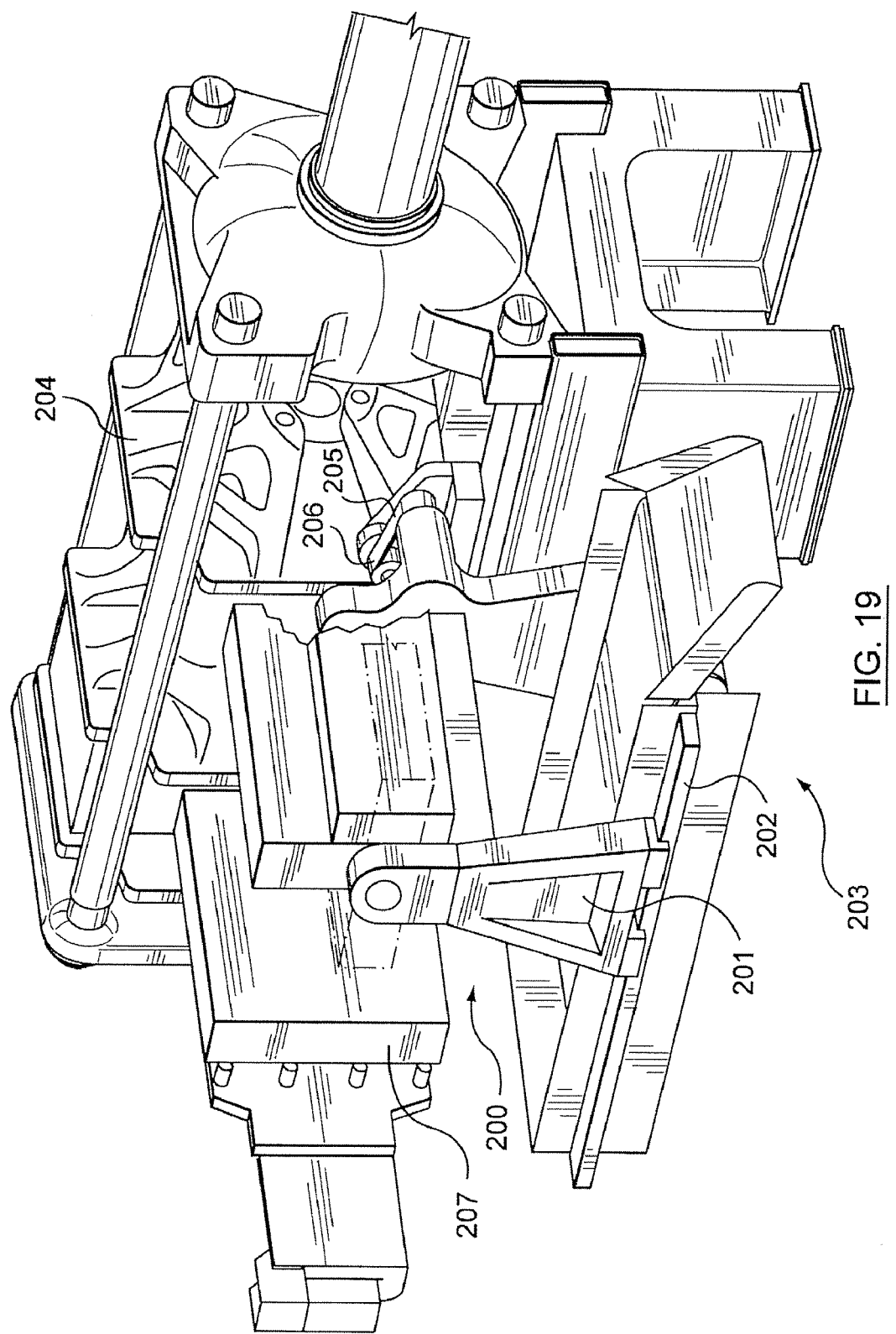
FIG. 19 is an isometric representation of another embodiment of the invention.

FIG. 19 shows an alternate embodiment in which the multiple treatment device 200 is mounted to its own movable carrier 201 that travels along rails 202 mounted to the conveyor assembly 203. The multiple treatment device 200 is releasably connected to the moving platen 204 of the machine by a linkage bar 205 and eccentric pin 206 arrangement that provides linear adjustment in the relative distance between the multiple treatment device 200 and the take out plate 207 in its outboard position. The linkage bar 205 provides a mechanical connection to the moving platen 204 so that the multiple treatment device 200 is moved by the moving platen 204. However, by separation of the linkage bar 205 from the moving platen 204, the multiple treatment device 200 can be easily moved on its carrier 201 away from the moving platen and the tooling plate 207 (when in its outboard position). This provides easy access to the mold, tooling plate, or multiple treatment device for maintenance and adjustment.

6. Conclusion

Thus, what has been described is a method and apparatus for efficiently cooling molded plastic articles, achieving reduced cycle time and costs. The present invention also provides an easily re-configurable arrangement of post mold treatment process options for the freshly molded parts such that an optimum configuration can be selected to match the characteristics of a wide variety of molded parts.

Advantageous features according the present invention include: 1. A cooling pin/part removal device mounted on a rotatable frame that is mounted on the moving platen such that the platen motion controls the insertion of the tube and the removal of the part. 2. The multiple treatment of multiple molded sets of parts while in a multi-position tooling plate using different treatment techniques: treatment A; treatment B; etc. facilitated by the robot aligning the tooling plate in pre-determined outboard positions.

While the present invention shortens the manufacturing time of blow molded container preforms generally having circular cross-sectional shapes perpendicular to the preform axis, those skilled in the art will realize the invention is equally applicable to other molded products possibly with non-circular cross-sectional shapes, such as, pails, paint cans, tote boxes, and other similar products requiring a similar general configuration and mold design characteristics as with the preform injection mold.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above are hereby incorporated by reference into the Detailed Description of the Preferred Embodiment.

What is claimed is:

1. Molded part handling apparatus for an injection molding machine having a fixed platen and a moving platen, the molded part handling device comprising:
   a take off device coupled to the fixed platen and configured to remove molded parts from between the fixed platen and the moving platen; and
   a cooling device coupled to the moving platen and configured to (i) move together with the moving platen, and (ii) cool the molded parts carried by said take off device.

2. Apparatus according to claim 1, wherein said cooling device is further configured to remove the molded parts from said take off device.

3. Apparatus according to claim 1, wherein said take off device is configured to move in a bi-directional linear fashion only.

4. Apparatus according to claim 1, wherein said cooling device is configured to move only rotationally with respect to the moving platen.

5. Apparatus according to claim 1, wherein said take off device includes a plurality of carriers which maintain a constant orientation.

6. Apparatus according to claim 5, wherein said plurality of carriers support multiple sets of molded parts, each set obtainable from a single molding shot.

7. Apparatus according to claim 1, wherein said cooling device includes one of a plurality of treatment A cooling pins and a plurality of treatment B cooling pins.

8. Apparatus according to claim 7, wherein said cooling device includes one of a plurality treatment A cooling pins and a plurality of treatment B cooling pins, and wherein said cooling device is configured to subject each molded part to a cooling treatment from a treatment A pin and to a cooling treatment from a treatment B pin.

9. Apparatus according to claim 1, wherein, when the moving platen moves toward the fixed platen the cooling device engages the take off device.

10. Apparatus according to claim 9, wherein, when the moving platen moves away from the fixed platen the cooling device is configured to remove molded parts from the take off device.

11. An injection molding machine, comprising:
a fixed platen;
a moving platen;
a take off device coupled to said fixed platen and configured to extract freshly molded parts from between the fixed platen and the moving platen;
a take off device actuator configured to linearly move said take off device to a position outboard of said fixed platen after said take off device has extracted the freshly molded parts from between the fixed platen and the moving platen;
a cooling device coupled to said movable platen and configured to (i) move together with the movable platen, (ii) extract molded parts carried by said take off device, and (iii) eject the molded parts from said cooling device at an ejection station; and
a cooling device actuator configured to rotate said cooling device about an axis to eject the molded parts.

12. An injection molding machine according to claim 11, wherein the movement of said moving platen causes:
the cooling device to engage with the take off device when in its outboard position; and
the core half to extract freshly molded parts from the cavity half, and simultaneously the cooling device to extract parts from the outboard take off device.

13. An injection molding machine according to claim 11, wherein said cooling device includes at least two different types of cooling structures.

14. An injection molding machine according to claim 11, wherein said takeoff device includes multiple sets of carriers, each set of carriers being configured to hold the freshly molded parts from one molding operation.

15. An injection molding machine according to claim 14, wherein said cooling device includes multiple sets of cooling pins, each set of cooling pins being configured to hold the freshly molded parts from one molding operation.

16. An injection molding machine according to claim 15, further comprising vacuum channels disposed in said cooling device for extracting the molded parts from said take off device and for ejecting the molded parts.

17. An injection molding machine according to claim 11, wherein said take off device is coupled to a top of said fixed platen.

18. An injection molding machine according to claim 11, wherein said take off device coupled to a side of said fixed platen.

19. An injection molding machine according to claim 11, further comprising a moveable carrier coupled to and supporting said cooling device.

20. An injection molding machine according to claim 19, further comprising a releasable linkage releasably coupling said cooling device to said movable platen.

21. An injection molding machine according to claim 20, wherein said movable carrier is configured to be coupled to a conveyor.

22. Molded part transfer apparatus for an injection molding machine having a fixed platen and a moving platen, comprising:
a take off device coupled to the fixed platen and configured to extract molded parts from the injection molding machine; and
a cooling device coupled to the moving platen and configured to (i) move together with the moving platen, and (ii) cool the parts carried by said take off device.

23. Molded part transfer apparatus for an injection molding machine having a fixed platen, a movable platen, comprising:
a take off device coupled to the fixed platen;
a rotatable frame mounted on the moving platen;
cooling pin/part removal device mounted on said rotatable frame; and
control structure which causes (i) the simultaneous movement of the moving platen with respect to the fixed platen, and said cooling pin/part removal device with respect to said take off device, and (ii) the rotation of said rotatable frame to eject parts from said cooling pin/part removal device.

24. Molded part transfer apparatus for an injection molding machine having a fixed platen, a movable platen, a core half, and a cavity half, comprising:
a take off device coupled to the fixed platen, said take off device having a plurality of sets of molded part carriers, each set of molded part carriers corresponding to a number of molded parts molded in one molding operation; and
a cooling device coupled to and movable together with the moving platen, said cooling device having a plurality of sets of cooling fixtures, each set of cooling fixtures corresponding to a number of molded parts molded in one molding operation, at least one of said sets of cooling fixtures being different from another set of cooling fixtures.

* * * * *